United States Patent [19]

Skeie et al.

[11] Patent Number: 4,625,208

[45] Date of Patent: Nov. 25, 1986

[54] SURFACE ACOUSTIC WAVE PASSIVE TRANSPONDER HAVING ACOUSTIC WAVE REFLECTORS

[75] Inventors: Halvor Skeie, San Jose; Paul A. Nysen, Sunnyvale, all of Calif.

[73] Assignee: X-Cyte Inc., Mountain View, Calif.

[21] Appl. No.: 509,527

[22] Filed: Jun. 30, 1983

[51] Int. Cl.⁴ .................. G01S 13/80; H03H 9/145; H03H 9/72

[52] U.S. Cl. .................................... 342/51; 333/154; 333/195; 310/313 D

[58] Field of Search ......... 343/6.5 SS, 6.8 R, 6.8 LL; 310/313 R, 313 B, 313 D; 333/150-155, 193-196

[56] References Cited

U.S. PATENT DOCUMENTS

| | | | |
|---|---|---|---|
| 3,273,146 | 9/1966 | Hurowitz, Jr. | 343/6.8 R |
| 3,706,094 | 12/1972 | Cole et al. | 343/6.8 R X |
| 3,755,803 | 8/1973 | Cole et al. | 343/6.8 R X |
| 3,845,420 | 10/1974 | Holland et al. | 333/150 |
| 3,931,597 | 1/1976 | Cho et al. | 333/154 |
| 4,028,649 | 6/1977 | Komotsu et al. | 310/313 B X |
| 4,058,217 | 11/1977 | Vaughan et al. | 209/559 |
| 4,059,831 | 11/1977 | Epstein | 343/6.8 R |
| 4,166,258 | 8/1979 | Tseng | 310/313 D |
| 4,263,571 | 4/1981 | Kinoshifa et al. | 333/195 X |
| 4,263,595 | 4/1981 | Vogel | 343/6.5 SS |
| 4,410,823 | 10/1983 | Miller et al. | 310/313 D |

Primary Examiner—T. H. Tubbesing
Assistant Examiner—Gilberto Barrón, Jr.
Attorney, Agent, or Firm—Karl F. Milde, Jr.

[57] ABSTRACT

A passive transponder for use in an interrogation/transponder system comprises a substrate having a substrate surface defining a path of travel for surface acoustic waves; at least one transducer element arranged on the surface for converting between electrical energy and surface acoustic wave energy which propagates along the path of travel; and a circuit, connected to the transducer element(s), for supplying interrogating signals to the transducer element(s) and for receiving reply signals therefrom. In order to minimize insertion losses in the substrate, acoustic wave reflectors are provided to reflect the surface acoustic waves back towards the transducer element(s).

18 Claims, 14 Drawing Figures

SURFACE ACOUSTIC WAVE PASSIVE TRANSPONDER HAVING ACOUSTIC WAVE REFLECTORS

CROSS REFERENCE TO RELATED APPLICATIONS

The present application is related in subject matter to the following commonly owned applications for patent: application Ser. No. 509,523, filed June 30, 1983, for "System for Interrogating A Passive Transponder Carrying Amplitude and/or Phase Encoded Information" of P. Nysen, H. Skeie and D. Armstrong;

application Ser. No. 509,522, filed June 30, 1983, for "Apparatus for Compensating Non-Linearities In A Frequency-Modulated Signal" of P. Nysen;

application Ser. No. 509,521, filed June 30, 1983, for "Surface Acoustic Wave Passive Transponder Having Optimally-Sized Transducers" of H. Skeie;

application Ser. No. 509,525, filed June 30, 1983, for "Surface Acoustic Wave Transponder Having Parallel Acoustic Wave Paths" of H. Skeie;

application Ser. No. 509,524, filed June 30, 1983, for "Surface Acoustic Wave Passive Transponder Having Non-Reflective Transducers and Pads" of H. Skeie;

application Ser. No. 509,526, filed June 30, 1983, for "Surface Acoustic Wave Passive Transponder Having Amplitude and Phase Modifying Surface Pads" of H. Skeie.

BACKGROUND OF THE INVENTION

The present invention relates to a "passive interrogator label system" (PILS); that is a system comprising an interrogator for transmitting an interrogation signal, one or more "labels" or passive transponders which produce a reply signal containing coded information in response to the interrogation signal, and a receiver and decoding system for receiving the reply signal and decoding the information contained therein.

A passive interrogator label system of the type to which the present invention relates is disclosed in the U.S. Pat. No. 3,273,146 to Horwitz, Jr.; U.S. Pat. No. 3,706,094 to Cole and Vaughan; U.S. Pat. No. 3,755,803 to Cole and Vaughan; and U.S. Pat. No. 4,058,217 to Vaughan and Cole. In its simplest form, the systems disclosed in these patents include a radio frequency transmitter capable of transmitting RF pulses of electromagnetic energy. These pulses are received at the antenna of a passive transponder and applied to a piezoelectric "launch" transducer adapted to convert the electrical energy received from the antenna into acoustic wave energy in the piezoelectric material. Upon receipt of a pulse, an acoustic wave is generated within the piezoelectric material and transmitted along a defined acoustic path. Further "tap" transducers arranged at prescribed, spaced intervals along this path convert the acoustic wave back into electric energy for reconversion into electrical energy by the launch transducer. The presence or absence of tap transducers at the prescribed locations along the acoustic wave path determines whether a reply pulse will be transmitted with a particular time delay, in response to an interrogation pulse. This determines the informational code contained in the transponder reply.

When an acoustic wave pulse is reconverted into an electrical signal it is supplied to an antenna on the transponder and transmitted as RF electromagnetic energy. This energy is received at a receiver and decoder, preferably at the same location as the interrogating transmitter, and the information contained in this response to an interrogation is decoded.

In the patent application Ser. No. 509,523, filed June 30, 1983, for "System for Interrogating a Passive Transponder Carrying Amplitude and/or Phase Encoded Information" of P. Nysen, H. Skeie, and D. Armstrong, it is proposed to provide an interrogator for transmitting a first, interrogation signal having a first frequency which successively assumes a plurality of frequency values within a prescribed frequency range. This first frequency may, for example, be in the range of 905 to 925 MHz, a frequency band which is freely available in many parts of the world for short range transmission.

The remote, passive transponder associated with this interrogator receives the first signal as an input, and produces a second, reply signal as an output. Signal transforming means within the transponder convert the first signal in such a way as to impart a known informational code in the second signal which is associated with and identifies the particular passive transponder.

Associated with the interrogator of the system is a receiver for receiving the second signal from the passive transponder and a mixer, arranged to receive both the first signal and the second signal, or signals derived therefrom, for mixing together these two signals and thereby producing a further signal. This further signal may, for example, contain the sum and the difference frequencies of the first and the second signals, respectively.

Finally, the proposed system includes a signal processor responsive to the signal produced by the mixer for detecting the frequencies contained in this signal to thereby determine the informational code associated with the passive transponder.

In systems of this general type, the energy contained in the reply signal is substantially less than the energy supplied to the transponder interrogating signal. This difference in energy is due, in part, to insertion losses; that is, losses in converting the electrical energy contained in an interrogating signal into surface acoustic wave energy and losses in reconverting this wave energy back again into electrical energy to form the reply signal.

SUMMARY OF THE INVENTION

It is an object of the present invention to provide a passive transponder adapted for use in an interrogation system for transmitting a reply signal containing encoded information in response to the receipt of an interrogating signal.

It is another object of the present invention to provide a passive transponder of the above-noted type which comprises a substrate having a substrate surface defining a path of travel for surface acoustic waves; at least one transducer element arranged on the substrate surface for converting between electrical energy and surface acoustic wave energy which propogates along the path of travel; and a circuit, connected to the transducer element(s) for supplying the interrogating signal to the transducer element(s) and for receiving the reply signal from the transducer element(s).

It is a further object of the present invention to provide a passive transponder of the above-noted type in which insertion losses are minimized.

These objects as well as other objects which will become apparent from the discussion that follows, are achieved, according to the present invention, by providing on the substrate surface a plurality of acoustic wave reflectors, arranged at spaced intervals along the path of travel for reflecting the surface acoustic wave back towards the transducer element(s).

Since reflectors of acoustic waves may be made extremely efficient--providing nearly 100% reflection of the acoustic wave energy--substantially all the acoustic wave energy which is generated by a transducer is reflected back to that transducer for reconversion into electrical energy. Theoretically, therefore, the total loss in energy conversion will be approximately be 3 db upon launching an acoustic wave and about 3 db in reconversion of the acoustic wave into an electrical signal, or 6 db. Various configurations of transducers and reflectors arranged on a piezoelectric substrate are described in detail below.

For a full understanding of the present invention, reference should now be made to the following detailed description of the preferred embodiment of the invention and the accompanying drawings.

DESCRIPTION OF THE PREFERRED EMBODIMENTS

Figure 1:
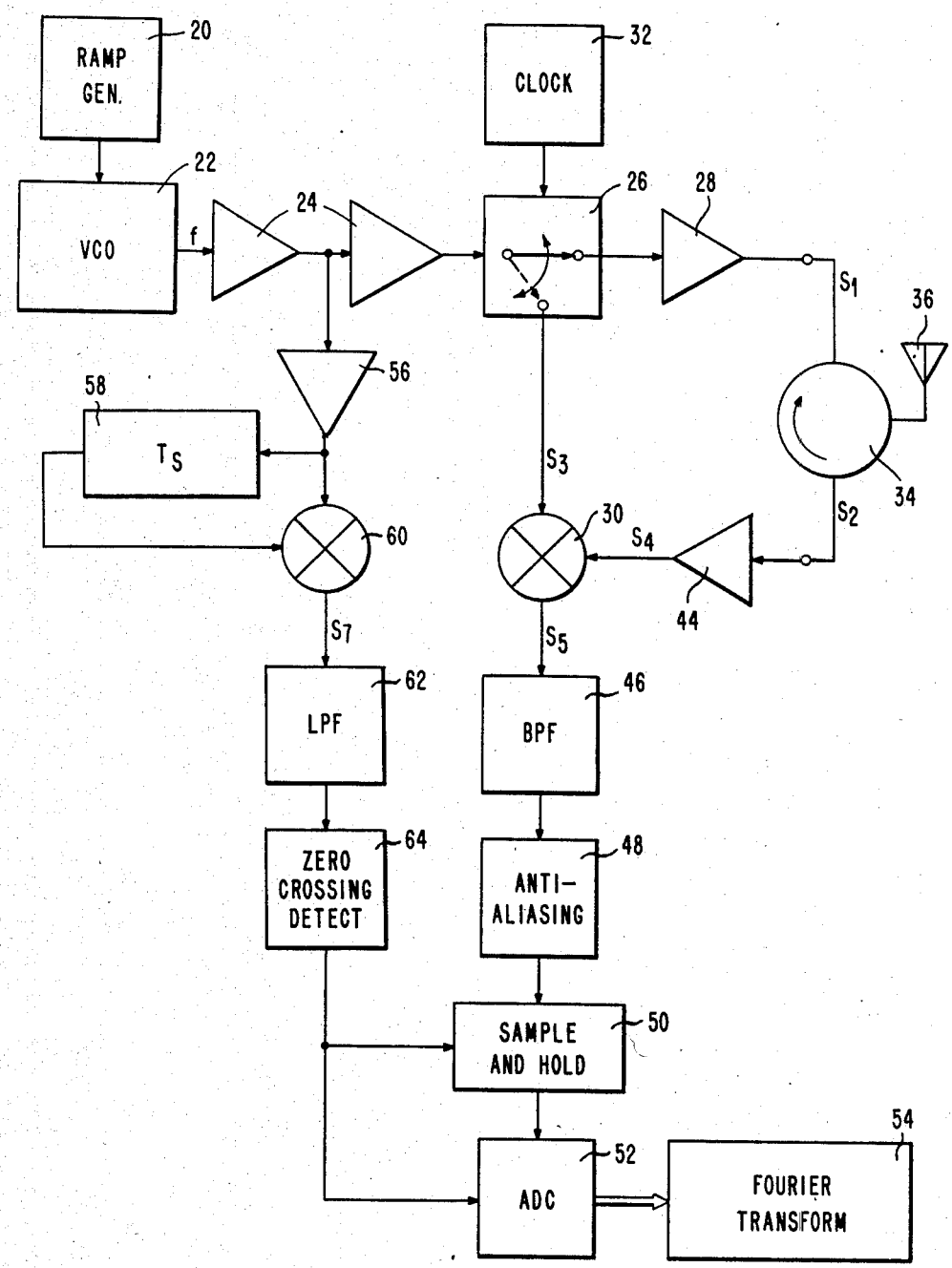
FIG. 1 is a block diagram of a system for transmitting an interrogation signal, receiving a reply signal and decoding information encoded in the reply signal.

The present invention will now be described with reference to FIGS. 1-- 14 of the drawings. Identical elements in the various figures are designated by the same reference numerals.

FIGS. 1-7 illustrate an interrogator-transponder system employing a surface acoustic wave transponder which may form the environment of the present invention. A system of this general type is disclosed in the U.S. Pat. No. 3,706,094 to Cole and Vaughn. This particular system is described in detail in the commonly-owned patent application Ser. No. 509,523, filed June 30, 1983, for "System for Interrogating a Passive Transponder Carrying Amplitude and/or Phase-Encoded Information" of P. Nysen, H. Skeie and D. Armstrong.

The transmitter/receiver and decoder system shown in FIG. 1 comprises a ramp generator 20 which supplies a sawtooth waveform to a voltage controlled oscillator (VCO) 22. The VCO produces an output signal of frequency f which repeatedly ramps linearly upward from a frequency of 905 MHz to a frequency of 925 MHz. This signal is amplified by the RF amplifiers 24 and supplied to a transmit/receive switch 26. The switch 26 directs the signal either to a transmitter power amplifier 28 or to a decoding mixer 30. The switch 26 is controlled by a 100 KHz square wave signal produced by a clock 32. The output signal $S_1$ from the amplifier 28 is supplied to an external circulator or transmit/receive (TR) switch 34 and is transmitted as electromagnetic radiation by an antenna 36.

Figure 2:
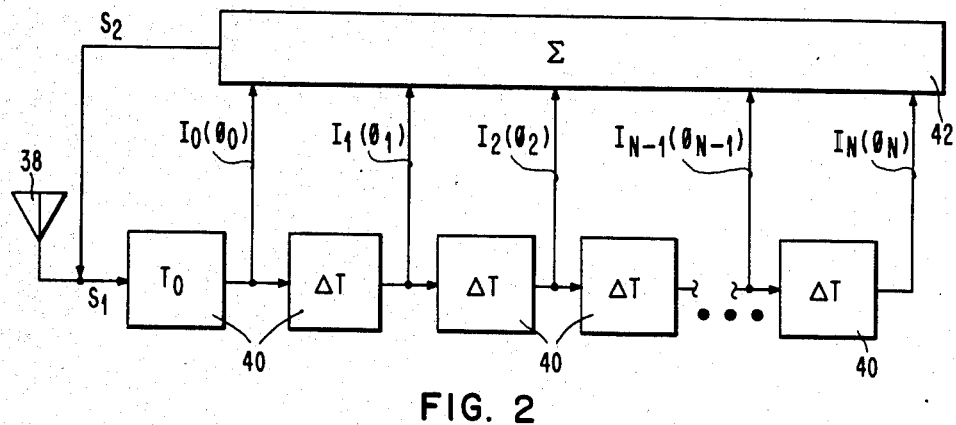
FIG. 2 is a block diagram of a passive transponder adapted for use with the system of FIG. 1.

A block diagram of the transponder associated with the system of FIG. 1 is shown in FIG. 2. The transponder receives the signal $S_1$ at an antenna 38 and passes it to a series of delay elements 40 having the indicated delay periods $T_0$ and $\Delta T$. After passing each successive delay, a portion of the signal $I_0, I_1, I_2 \ldots I_N$ is tapped off and supplied to a summing element 111. The resulting signal $S_2$, which is the sum of the intermediate signals $I_0 \ldots I_N$, is fed back to the antenna 38 for transmission to the antenna 36 in the system of FIG. 1.

The transponder reply signal $S_2$ is received by the antenna 36 and passed through the circulator or TR switch 34 to a receiver amplifier 44. The output $S_4$ of this amplifier 44 is heterodyned in the mixer with the signal $S_3$ intermittently presented by the switch 26.

The output $S_5$ of the mixer 30 contains the sum and the difference frequencies of the signals $S_3$ and $S_4$. This output is supplied to a band pass filter 46 with a pass band between 1 and 3 KHz. The output of this filter is passed through an anti-aliasing filter 48 to a sample-and-hold circuit 50.

The sample-and-hold device supplies each sample to an analog-to-digital converter 52. The A/D converter, in turn, presents the digital value of this sample to a processor 54 that analyzes the frequencies contained in the signal by means of a Fourier transform. The sample-and-hold device 50 and the A/D converter 52 are strobed by a sampling signal which serves to compensate for the non-linearity, with respect to time, in the monotonically increasing frequency f of the VCO output signal.

To effect compensation the signal of frequency f produced by the VCO 22 is passed via an isolating amplifier 56 to a delay element 58 with a constant signal delay $T_s$. Both the delayed and the undelayed signals are supplied to a mixer 60 which produces a signal $S_7$ containing both sum and difference frequencies. The signal $S_7$ is supplied to a low-pass filter 62 which passes only the portion of this signal containing the difference frequencies. The output of the low-pass filter is supplied to a zero-crossing detector 64 which produces a pulse at each positive (or negative) going zero crossing. These pulses are used to strobe the sample-and-hold device 50 and the A/D converter 52.

Figure 3:
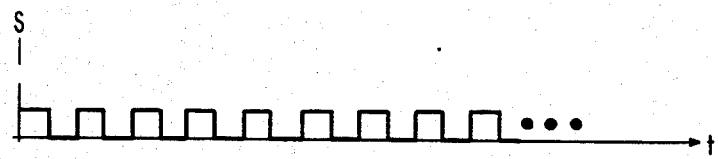
FIG. 3 is a timing diagram indicating the clock output in the system of FIG. 1.
Figure 4:
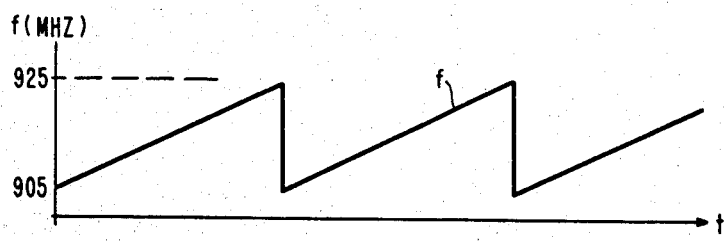
FIG. 4 is a frequency vs. time diagram illustrating the transmitted signal in the system of FIG. 1.
Figure 5:
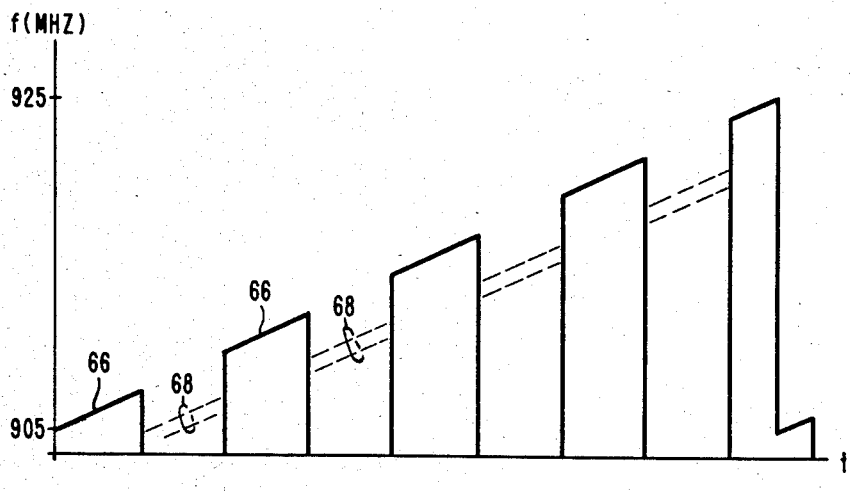
FIG. 5 is a frequency vs. time diagram illustrating both the transmitted and the received signal in the system of FIG. 1.

FIGS. 3-5 illustrate the operation of the circuit of FIG. 1. FIG. 3 shows the 100 KHz output of the clock 32; FIG. 4 shows the frequency sweep of the signal produced by the VCO 22. FIG. 5 shows, in solid lines 66, the frequency of the transmitted signal $S_1$ and, in dashed lines 66, the frequency of the signal $S_2$ as received from the transponder. As may be seen, the signal 68 is received during the interval between transmissions of the signal 66. These intervals are chosen to equal, approximately, the round trip delay time between the transmission of a signal to the transponder and the receipt of the transponder reply. As indicated by the multiple dashed lines, the transponder reply will contain a number of frequencies at any given instant of time as a result of the combined (i.e., summed) intermediate signals having different delay times $(T_0, T_0+\Delta T, T_0+2\Delta T, \ldots T_0+N \Delta T)$.

Figure 6:
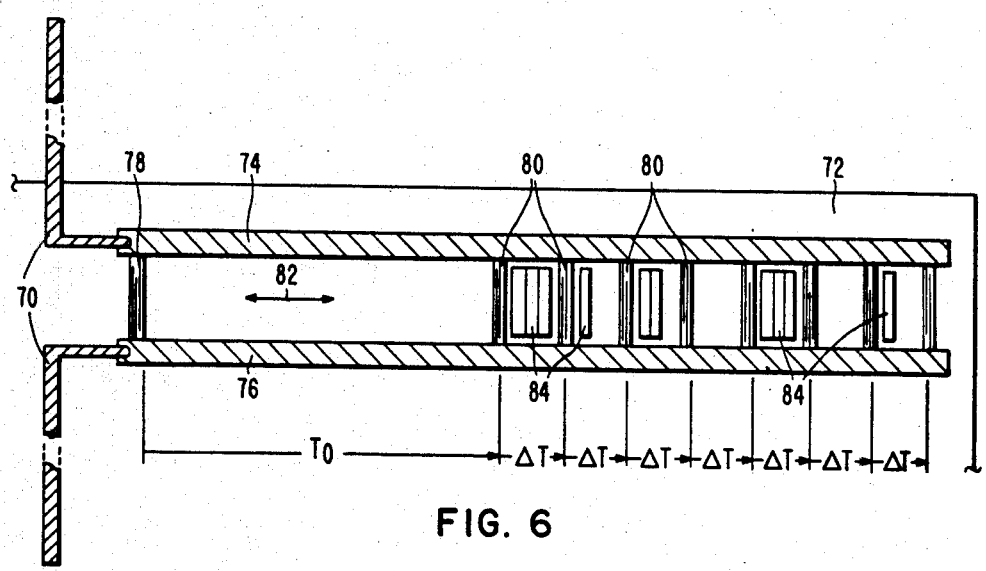
FIG. 6 is a plan view, in enlarged scale, of a particular implementation of the transponder of FIG. 2.
Figure 7:
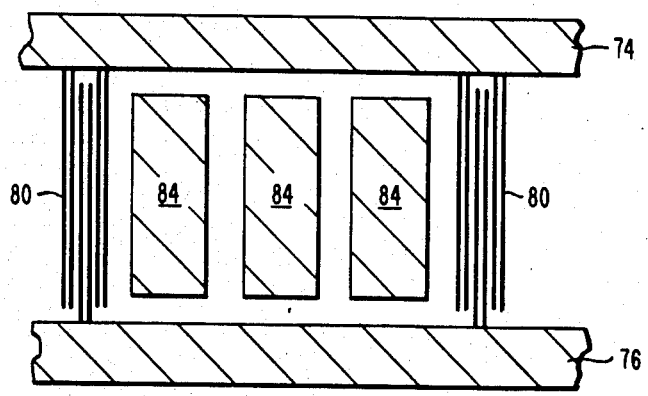
FIG. 7 is a plan view, in greatly enlarged scale, of a portion of the implementation shown in FIG. 6.

FIGS. 6 and 7 illustrate an embodiment of a passive transponder which implements the block diagram of FIG. 2. This transponder operates to convert the received signal $S_1$ into an acoustic wave and then to reconvert the acoustic energy back into an electrical signal $S_2$ for transmission via a dipole antenna 70. More particularly, the signal transforming element of the transponder includes a substrate 72 of piezoelectric material such as a lithium niobate ($LiNbO_3$) crystal. On the surface of this substrate is deposited a layer of metal, such as aluminum, forming a pattern such as that shown in detail in FIG. 7. For example, this pattern may consist of two bus bars 74 and 76 connected to the dipole antenna 70, a "launch" transducer 78 and a plurality of "tap" transducers 80. The bars 74 and 76 thus define a path of travel 82 for a surface acoustic wave which is generated by the launch transducer and propogates substantially linearly, reaching the tap transducers each in turn. The tap transducers convert the surface acoustic wave back into electrical energy which is collected and therefore summed by the bus bars 74 and 76. This electrical energy then activates the dipole antenna 70 and is converted into electromagnetic radiation for transmission as the signal $S_2$.

The tap transducers 80 are provided at equally spaced intervals along the surface acoustic wave path 82, as shown in FIG. 6, and an informational code associated with the transponder is imparted by providing a selected number of "delay pads" 84 between the tap transducers. These delay pads, which are shown in detail in FIG. 7, are preferably made of the same material as, and deposited with, the bus bars 74, 76 and the transducers 78, 80. Each delay pad has a width sufficient to delay the propagation of the surface acoustic wave from one tap transducer 80 to the next by one quarter cycle or 90° with respect to an undelayed wave at the frequency of operation (circa 915 MHz). By providing locations for three delay pads between successive tap transducers, the phase $\phi$ of the surface acoustic wave received by a tap transducer may be controlled to provide four phase possibilities:

1. No pad between successive tap transducers = $-90°$;
2. One pad between successive tap transducers = $0°$;
3. Two pads between successive tap transducers = $+90°$;
4. Three pads between successive tap transducers = $+180°$;

Referring to FIG. 2 the phase information $\phi_0$ (the phase of the signal picked up by the first tap transducer in line), and $\phi_1, \phi_2 \ldots \phi_N$ (the phases of the signals picked up by the successive tap transducers) is supplied to the combiner (summer) which in the embodiment of FIG. 6 comprises the bus bars 74 and 76. This phase information, which is transmitted as the signal $S_2$ by the antenna 70, contains the informational code of the transponder.

While a system of the type described above operates satisfactorily when the number of tap transducers does not exceed eight, the signal to noise ratio in the transponder reply signal is severly degraded as the number of tap transducers increases. This is because the tap transducers additionally act as launch transducers as well as partial reflectors of the surface acoustic wave so that an increase in the number of tap transducers results in a corresponding increase in spurious signals in the transponder replies. This limitation on the number of tap transducers places a limitation on the length of the informational code imparted in the transponder replies.

The present invention provides a means for reducing spurious signals as well as insertion losses in a passive transponder so that the informational code may be increased in size to any desired length. Such advantages are achieved by providing one or more surface acoustic wave reflectors on the piezoelectric substrate in the path of travel of the surface acoustic wave to reflect the acoustic waves back toward a transducer for reconversion into an electric signal.

Figure 8:
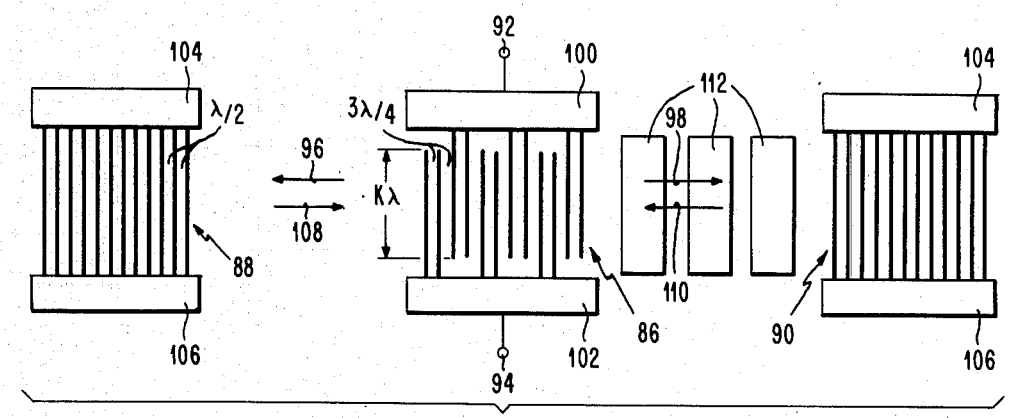
FIG. 8 is a plan view, in greatly enlarged scale, of a transducer and two reflectors of the type employed in the present invention.

FIG. 8 illustrates the general concept of the invention whereby a transducer 86 is employed in conjunction with reflectors 88 and 90 in a unique configuration which replaces the arrangement of FIG. 6 having a launch transducer 78 and tap transducers 80. In particular, the transducer 86 is constructed to convert electrical energy received at the terminals 92 and 94 into surface acoustic wave energy which propogates outward in opposite directions indicated by the arrows 96 and 98. The launch transducer is constructed in a well known manner with an inter-digital electrode assembly formed of individual electrode fingers arranged between and connected to the two bus bars 100 and 102. In the illustrated pattern, half the fingers are connected to the bus bar 100 and the other half are connected to the bus bar 102. Each electrode is connected to one or the other bus bar and extends toward a free end in the direction of the other bus bar.

It will be appreciated that the size of the transducer is expandable at will by merely adding electrode fingers in the same pattern shown. The size of the transducer is thus determined by the number of fingers arranged in parallel.

Also in accordance with well known practice, the distance between successive fingers is equal to $3\lambda/4$ where $\lambda$ is the center wavelength of the surface acoustic wave. This distance $3\lambda/4$ is measured between the centers of the individual electrodes. Furthermore, as may be seen, the length of the active region between the ends of the electrodes connected to the bus bar 100 and the ends of the electrodes connected to the bus bar 102 is $K\lambda$, where K is a proportionality constant.

Surface acoustic waves which travel outward from the transducer 86 in the directions 96 and 98 encounter and are reflected back by the reflectors 88 and 90. These reflectors comprise individual electrode fingers which extend between the bus bars 104 and 106 on opposite sides. As shown in FIG. 8, these electrodes are spaced from center to center, a distance $\lambda/2$ apart.

The reflectors 88 and 90 serve to reflect nearly 100% of the surface acoustic wave energy back toward the transducer 86; that is, in the directions 108 and 110, respectively. Thus, after a pulse of surface acoustic wave energy is generated by the transducer 86, it is reflected back by the reflectors 88 and 90 and reconverted into an electrical signal by the transducer 86.

The configuration of FIG. 8 may also include one or more delay pads 112 which control the phase of the surface acoustic wave received back by the transducer 86. For a 90° phase delay (as compared to the phase of the received surface acoustic wave without a delay pad present) the delay pad should have a width equal to ½ the width of the delay pads in the transponder configuration of FIG. 6 and 7 because the surface acoustic wave will traverse the delay pads twice (i.e., in both directions).

Figure 9:
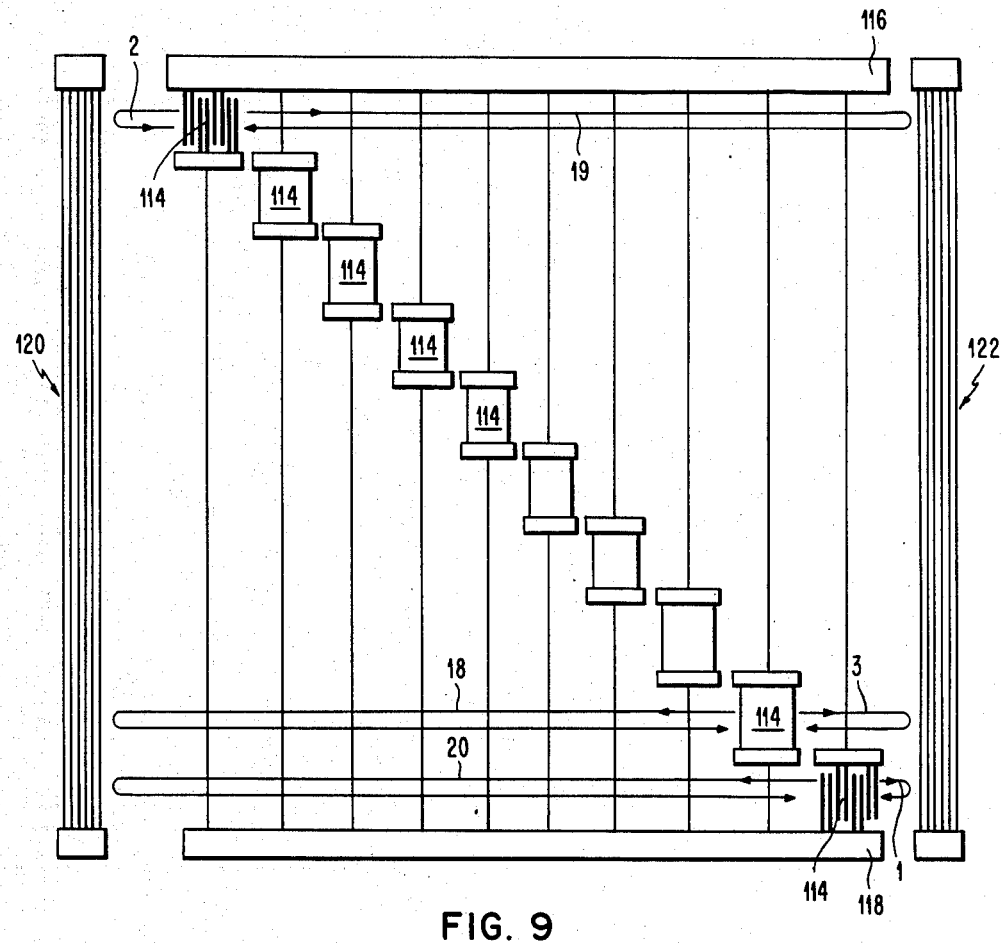
FIG. 9 is a plan view, in greatly enlarged scale, of a transducer/reflector pattern according to a preferred embodiment of the invention.

FIG. 9 illustrates an entire transponder system utilizing the concept shown in FIG. 8. In FIG. 9 a plurality of transducers 114 are connected to common bus bars 116 and 118 which, in turn, are connected to the dipole antenna (not shown) of the transponder. On opposite sides of this configuration and reflectors 120 and 122 which reflect surface acoustic waves back toward the transducers which launched them.

Since the transducers 114 are connected in parallel, an interrogation pulse at radio frequency is received by all the transducers simultaneously. Consequently, these transducers simultaneously generate surface acoustic waves which are transmitted outward in both directions. Due to the particular configuration shown, the reflected surface acoustic waves are received at staggered intervals so that a single interrogation pulse produces a series of reply pulses after respective periods of delay. FIG. 9 illustrates the time order of the reflected signals as 1, 2, 3, . . . 18, 19 and 20.

Figure 10:
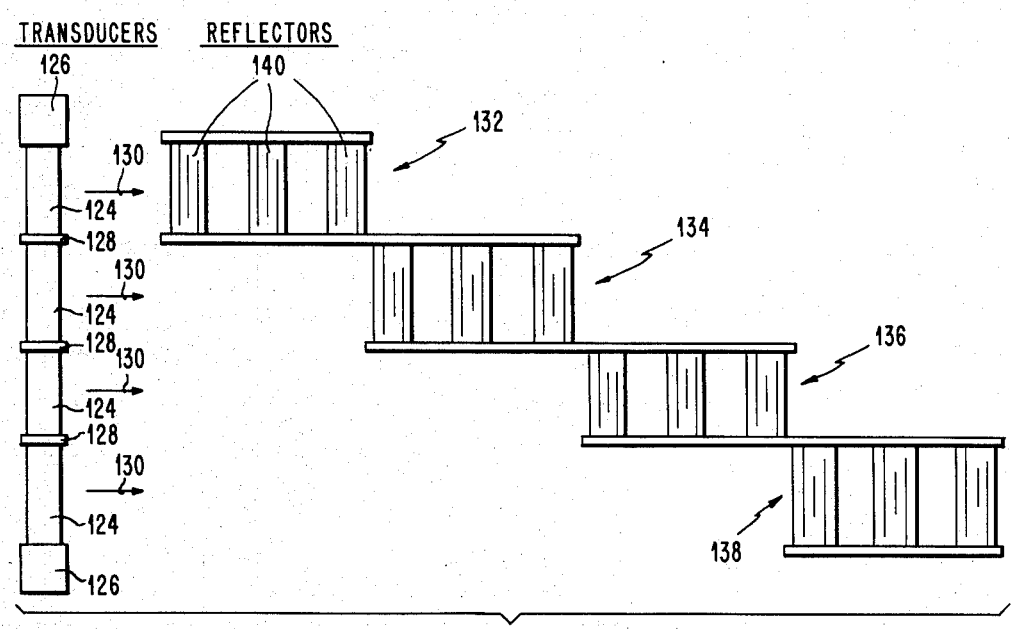
FIG. 10 is a plan view, in greatly enlarged scale, of a transducer/reflector pattern according to a second preferred embodiment of the invention.

FIG. 10 shows another embodiment of a passive transponder having transducers and reflectors according to another preferred embodiment of the present invention. In this case, four transducers 124 are connected electrically in series between bus bars 126. These transducers are interconnected by means of intermediate electrods 128, the electrical circuit through each transducer being effected by capacitive coupling. When energized by an RF electrical signal, the transducers simultaneously produce surface acoustic waves which travel in four parallel paths 130.

To the right of the transducers 124 in FIG. 10 are four sets 132, 134, 136 and 138 of reflectors 140 arranged in the paths of travel 130 of the surface acoustic waves. In the example shown, three reflectors 140 are arranged in each set; however, the number of reflectors may be varied. If only a single reflector is provided in each of the positions 132, 134, 136 and 138, this reflector should be designed to reflect nearly 100% of the surface acoustic waves at the wavelength of these waves. If more than one reflector is provided, these reflectors should be designed to reflect only a portion of the acoustic wave energy.

In the embodiment shown in FIG. 10, for example, where three reflectors are provided in each set, the first and second reflectors should allow some of the acoustic wave energy to pass beneath them to the third and last reflector in line. In this way, if a pulse of surface acoustic wave energy is generated by a transducer 124, some of it will be reflected by the first transducer, some by the second and some by the third reflector in line.

Figure 11:
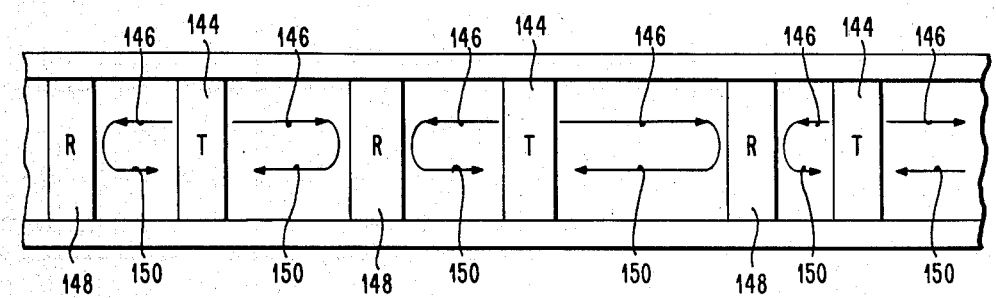
FIG. 11 is a plan view, in greatly enlarged scale, of a transducer/reflector pattern according to a third preferred embodiment of the present invention.

FIG. 11 shows another preferred embodiment wherein the transducers are arranged between common bus bars 140 and 142. These transducers 144 (designated "T" in FIG. 11) generate surface acoustic waves in opposite directions as indicated by the arrows 146. These acoustic waves are reflected by the reflectors 148 (designated with an "R" in FIG. 11) and returned toward the transducers in the direction indicated by the arrows 150. As is illustrated in FIG. 11, the distances between the transducers 144 and reflectors 148 are staggered so that a single interrogator pulse results in a succession of reply pulses.

Figure 12:
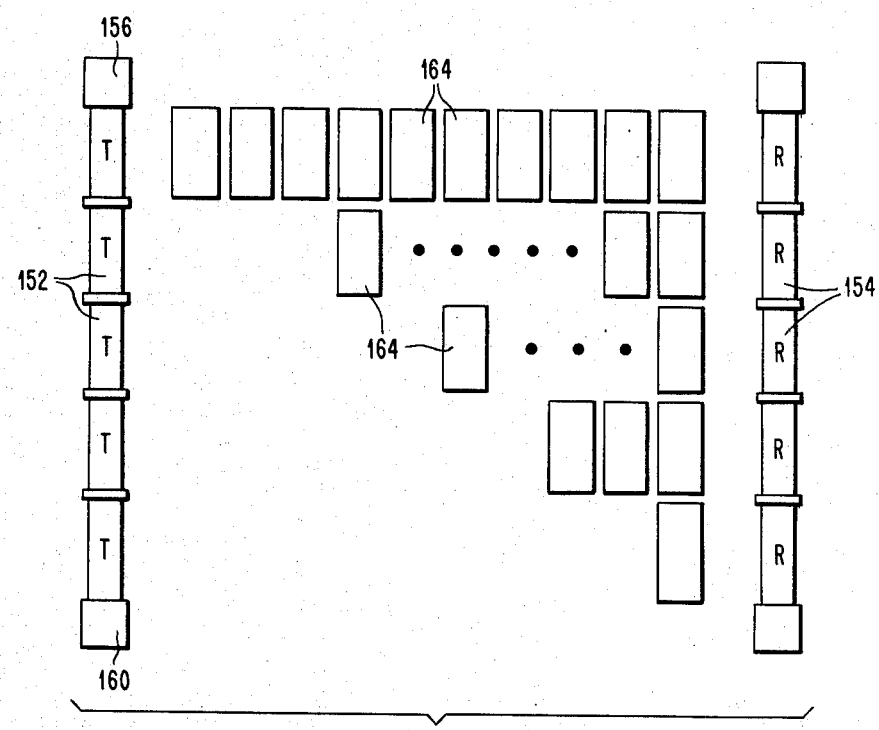
FIG. 12 is a plan view, in greatly enlarged scale, of a transducer/reflector pattern according to a fourth preferred embodiment of the present invention.

FIG. 12 shows another preferred embodiment of the invention comprising a number of transducers 152 connected electrically in series and a number of reflectors 154 connected electrically in series. Both the transducers and the reflectors are "tuned" to operate at different surface acoustic wavelengths so that, depending upon the particular frequency applied to the terminal electrodes 156 and 160, a particular one of the transducers will generate a surface acoustic wave. This surface acoustic wave will travel toward the right (in the sense of FIG. 12) and be reflected back by the respective reflector 154 which is also tuned to the same wavelength as its corresponding transducer.

Figure 13:
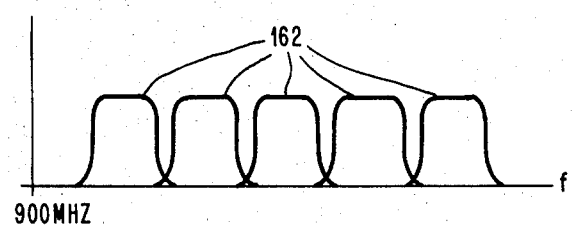
FIG. 13 is a frequency diagram showing the frequency bands of the respective interrogationsignal pulses in the configuration of FIG. 12.

FIG. 13 illustrates the different frequency bands of the interrogation signals required for the transponder embodiment illustrated in FIG. 12. As is shown, there are five frequency bands 162, one for each of the five transducers 152 and corresponding reflectors 154.

In the embodiment of FIG. 12, the information code of the transponder is imparted by providing a selected number of delay pads 164 between the transducers 152 and reflectors 154. These delay pads modify the phase of the surface acoustic waves which propogate toward the reflectors 154 and then return to the transducers 152.

Figure 14:
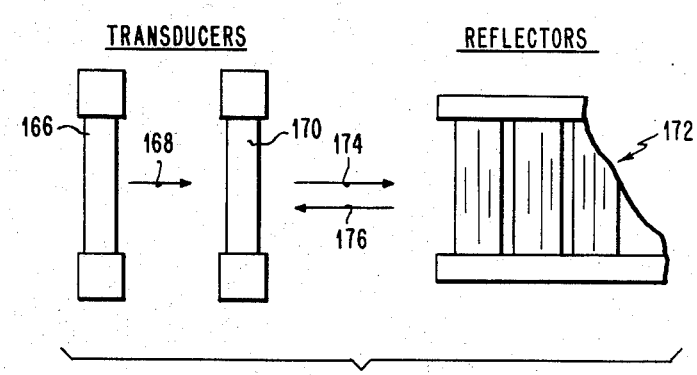
FIG. 14 is a plan view, in greatly enlarged scale, of a portion of a transducer/reflector pattern according to a fifth preferred embodiment of the present invention.

FIG. 14 illustrates still another embodiment of a transponder according to the present invention which comprises separate launch and receiving transducers. As may be seen, surface acoustic waves are generated by a launch transducer 166 and propogated in the direction indicated by the arrow 168. These surface acoustic waves pass beneath the receiving transducer 170 and continue on toward one or more reflectors 172 in the direction indicated by the arrow 174. This acoustic wave energy is reflected by the reflectors 172 and directed back toward the receiving transducer 170 in the direction indicated by the arrow 176.

In the embodiment shown in FIG. 14, the launch and receiving transducers may be connected to separate dipole antennas. This may be advantageous in certain applications since the different antennas may receive and radiate energy in different directions.

There has thus been shown and described a novel surface acoustic wave passive transponder, having acoustic reflectors, which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a passive transponder adapted for use in an interrogation system for transmitting a reply signal containing coded information in response to the receipt of an interrogating signal, said transponder comprising:
   (a) an antenna for converting between electrical energy and electromagnetic energy;
   (b) a substrate having a substrate surface defining a plurality of paths of travel for surface acoustic waves;
   (c) transducer means, electrically connected to said antenna and arranged on said substrate surface, for converting between electrical energy and surface acoustic wave energy which propagates along said paths of travel, said transducer means comprising a plurality of transducer elements, electrically connected together, for converting said interrogation signal into surface acoustic wave energy, each one of said transducer elements being responsive to produce surface acoustic waves within a specified frequency band upon application of an interrogating signal having a frequency within such band, the frequency bands of at least two different transducer elements being exclusive of each other so that an interrogating signal of a given frequency will excite a specific one of said transducer elements;
   (d) a plurality of acoustic wave reflectors arranged on said surface along said paths of travel for reflecting said surface acoustic wave energy back toward said transducer means, said paths of travel extending in at least one direction from said transducer means along at least one common line, wherein said reflectors are arranged along said common line and wherein at least one of said reflectors, closest to said transducer means, reflects only a portion of the acoustic wave energy received, thereby to permit a portion of said acoustic wave energy to pass beneath said one reflector to reach the next reflector along said common line; and
   (e) circuit means, connected to said transducer means, for supplying said interrogating signal to said transducer means and for receiving said reply signal from said transducer means.

2. The transponder defined in claim 1, further comprising at least one surface acoustic wave delay pad disposed on the surface of said substrate along said path of travel to control the surface acoustic wave propagation time from launch to receipt by said transducer means.

3. The transponder defined in claim 2, wherein a plurality of said pads are provided, said pads being located between said transducer means and said reflectors to control the delay time between transducer means and said reflectors.

4. The transponder defined in claim 1, wherein said transducer means comprises at least one common transducer element for converting said interrogating signal into surface acoustic wave energy and reconverting the reflected surface acoustic wave energy into said reply signal.

5. The transponder defined in claim 1, wherein said transducer means comprises at least one first transducer element for converting said interrogation signal into surface acoustic wave energy and at least one separate, second transducer element for reconverting the reflected surface acoustic wave energy into said reply signal.

6. The transponder defined in claim 1, wherein said reflectors are arranged in a plurality of parallel paths of travel for surface acoustic waves.

7. The transponder defined in claim 6, wherein said reflectors are arranged such that said acoustic wave, propogated from said transducer means, arrives at all of the reflectors arranged in one path before arriving at the reflectors arranged in another, parallel path.

8. The transponder defined in claim 1, wherein said reflectors are arranged on said substrate such that said acoustic wave propogated from said transducer means arrives at each reflector at a different time.

9. In a passive transponder adapted for use in an interrogation system for transmitting a reply signal containing coded information in response to the receipt of an interrogating signal, said transponder comprising:
   (a) a substrate having a substrate surface defining a plurality of paths of travel for surface acoustic waves;
   (b) transducer means arranged on said surface for converting between electrical energy and surface acoustic wave energy which propagates along said paths of travel;
   (c) a plurality of acoustic wave reflectors arranged on said surface along said paths of travel for reflecting said surface acoustic wave energy back toward said transducer means; and
   (d) circuit means, connected to said transducer means, for supplying said interrogating signal to said transducer means and for receiving said reply signal from said transducer means;
   the improvement wherein said paths of travel extend in at least one direction from said transducer means along at least one common line, wherein said reflectors are arranged along said common line, and wherein at least one of said reflectors closest to said transducer means, reflects only a portion of the acoustic wave energy received,
   thereby to permit a portion of said acoustic wave energy to pass beneath said one reflector to reach the next reflector along said common line.

10. The transponder defined in claim 9, wherein said transducer means comprises at least one common transducer element for converting said interrogating signal into surface acoustic wave energy and reconverting the reflected surface acoustic wave energy into said reply signal.

11. The transponder defined in claim 9, wherein said paths of travel extend in opposite directions from said transducer means, and wherein said reflectors are arranged on said substrate on both sides of said transducer means,
   thereby to reflect surface acoustic wave energy back toward said transducer means in two directions.

12. The transponder defined in claim 9, wherein said transducer means comprises a plurality of transducer elements for converting said interrogating signal into surface acoustic wave energy, and wherein said circuit means includes means electrically connecting said transducer elements in parallel.

13. The transponder defined in claim 12, further comprising an antenna, and wherein said circuit means includes means for coupling said means for electrically connecting said transducer elements to said antenna.

14. The transponder defined in claim 12, wherein said transducer elements are arranged substantially end to end, thereby defining a plurality of parallel paths of travel for surface acoustic waves.

15. The transponder defined in claim 9, wherein said transducer means comprises a plurality of transducer elements for converting said interrogating signal into surface acoustic wave energy, and wherein said circuit means includes means for electrically connecting said transducer elements in series.

16. The transponder defined in claim 15, further comprising an antenna, and wherein said circuit means includes means for coupling said means for electrically connecting said transducer elements to said antenna.

17. The transponder defined in claim 15, wherein said transducer elements are arranged substantially end to end, thereby defining a plurality of parallel paths of travel for surface acoustic waves.

18. The transponder defined in claim 9, wherein said transducer means comprises a plurality of transducer elements for converting said interrogating signal into surface acoustic wave energy, each one of said transducer elements being responsive to produce surface acoustic waves within a specified frequency band upon application of an interrogating signal having a frequency within such band, the frequency bands of the different transducer elements being exclusive of each other, whereby an interrogating signal of a given frequency will excite a specific one of said transducer elements.

* * * * *